(No Model.)

G. A. BOYDEN.
Can Soldering Machine.

No. 237,238. Patented Feb. 1, 1881.

Witnesses:
A. Cooper
W. B. Mann

Inventor:
George A. Boyden
By his Atty
Chas B. Mann

N. PETERS, PHOTO-LITHOGRAPHER, WASHINGTON, D. C.

(No Model.)  5 Sheets—Sheet 3.

G. A. BOYDEN.
Can Soldering Machine.

No. 237,238.  Patented Feb. 1, 1881.

Witnesses:
A. Cooper
W. B. Mann

Inventor:
George A. Boyden
By his Atty
Chas. B. Mann (No Model.) 5 Sheets—Sheet 4.

G. A. BOYDEN.
Can Soldering Machine.

No. 237,238. Patented Feb. 1, 1881.

Witnesses:
A. Cooper
W. B. Mann

Inventor:
George A. Boyden
By his Atty
Chas B. Mann (No Model.)  5 Sheets—Sheet 5.

G. A. BOYDEN.
Can Soldering Machine.

No. 237,238.  Patented Feb. 1, 1881.

Witnesses:
A. Cooper
W. B. Mann

Inventor:
George A. Boyden
By his Atty
Chas. B. Mann

UNITED STATES PATENT OFFICE.

GEORGE A. BOYDEN, OF BALTIMORE, MARYLAND.

CAN-SOLDERING MACHINE.

SPECIFICATION forming part of Letters Patent No. 237,238, dated February 1, 1881.

Application filed December 29, 1880. (No model.)

*To all whom it may concern:*

Be it known that I, GEORGE A. BOYDEN, a citizen of the United States, residing at Baltimore, in the county of Baltimore and State of Maryland, have invented certain new and useful Improvements in Can-Soldering Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part or this specification.

My invention relates to improvements in machines for soldering the seams of cans, the object being to construct mechanism and arrange it into an organized machine which shall be capable of soldering both the top and bottom to a can-body without handling the can or removing it until the operation is completed; and a further object is to include in a machine organized as aforesaid mechanism for soldering the side or body seam, whereby the one machine shall be adapted to solder the seams of both ends and the side without the manual labor of rehandling or removing the can.

In the accompanying drawings, to which reference is made, Fig. 11 is a view of the stationary solder-receptacle. Fig. 12 is a transverse view of same, the receptacle being in section. Figs. 13, 14, and 15 are views of the device for operating the valve of solder-receptacle. Fig. 16 is a front view of the device for retaining the can-carrier from moving. Fig. 17 is a side view, and Fig. 18 a top view, of part of the same.

The letter A designates the principal side standard of the frame, A' the opposite one, and $A^2$ the top cross-beam which connects the two standards. The two side standards are both necessary where the machine is organized, as in the present example, to solder two cans in each position (*i. e.*, side by side) simultaneously; but I contemplate the construction of a machine of less capacity, wherein but one can will be in position where two are now shown, and in such case only the principal side standard, A, would be requisite.

A bearing, $a$, (shown in section in Fig. 4 in the present example,) is cast integral with the principal standard, and into this bearing is secured one end, B', of an outside turned and hollow arm, whose other end projects horizontally and forms a trunnion, B. The end B' is secured by a nut, $b$, which rests against the outer end of the bearing and draws the shoulder $B^2$ of the trunnion against the other end of the bearing.

Upon the trunnion is a box or collar, C', which fits loosely so as to turn, and has an upright arm, C, which is adapted to rock, as hereinafter set forth.

Figure 6:
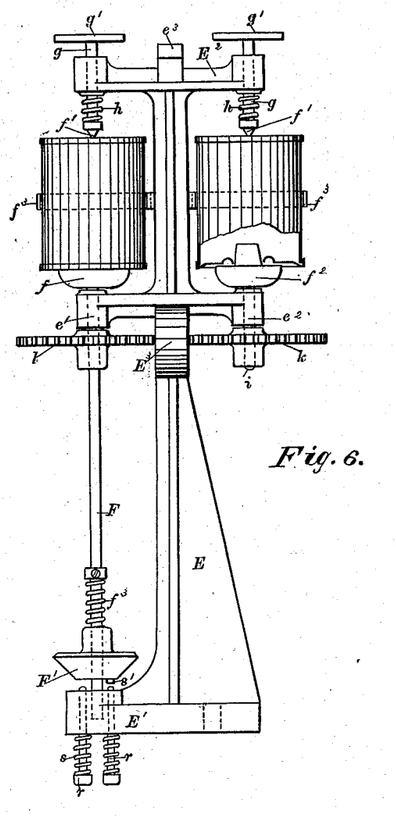
Fig. 6 is a front view of the can-carrying arm with its attached can-holders.
Figures 7, 8, 9, 10:
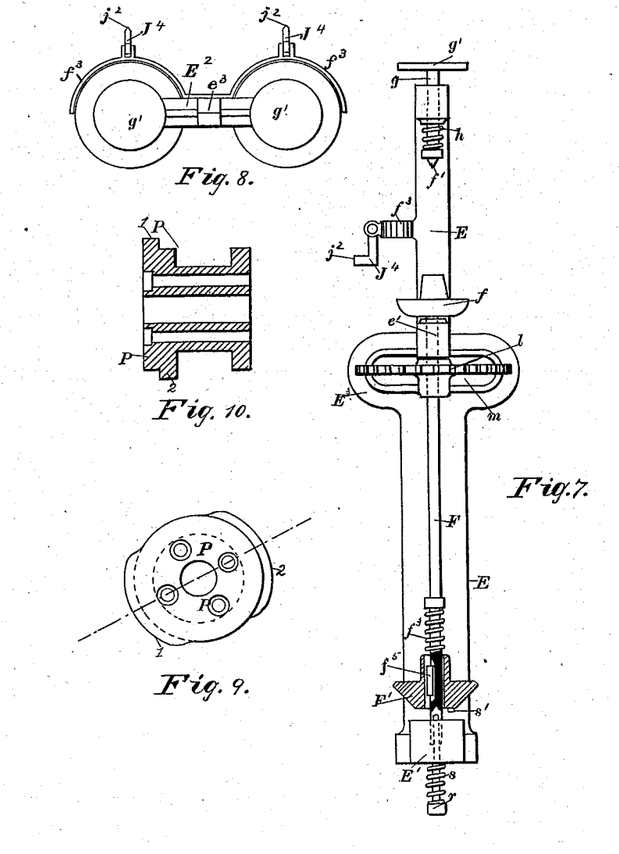
Fig. 7 is a side view of same.
Fig. 8 is an end view of the can-holders.
Fig. 9 is a side view of the double cam.
Fig. 10 is a transverse section of same.

A hub, D, made in two parts bolted together, is mounted on the trunnion, and is adapted to rotate thereon. In the present example the greatest circumference of this hub has eight ratchet-teeth, $c$, (shown in Fig. 4,) with which the spring latch or pawl G engages and causes the hub to rotate. A lesser circumference of the hub has eight sides or faces, $d$; but the hub may have a less number—as, for instance, four. To this hub a can-carrier is attached, which is carried around in a vertical plane by the rotation of the hub. In the present example the can-carrier consists of a radial arm, E, having at its base a flange through which bolts $e$ pass to secure it to one of the faces, $d$, of the hub. One side of the base of the arm forms a projection, E', which stands off beyond the end of the hub. Two, four, six, or eight arms may be used, each arm being designed to carry a can-holding device of suitable structure to sustain the can always in the same position relatively to the horizontal axis of the vertically-rotating carrier, and thus afford access of the several soldering devices when the can is in the various positions required for soldering. The outermost part of the projection E' serves as a step for the spindle of a shaft, F, whose outer end carries a can-seat or holding-disk, $f$, near which the shaft has support in a bearing, $e'$, which projects from the side of the arm E. At the outer extremity of the said arm is a cross-piece, $E^2$, each end of which constitutes a bearing for the spindles $g$ of the can-centering points $f'$. Instead of points disks may be used. The spindles have both a rotary and an endwise movement, and a spring, $h$, is attached about each spindle to keep the point or disk normally pressed toward its coacting seat or disk $f$—the two constituting the can-holding device. Where center points, $f'$, are used, or disks which are smaller than the head of the can against which they bear, a guide or can-centering device is necessary. This is shown in Figs. 6, 7, and 8, and consists of a segment-shaped band, $f^3$, attached to the arm E at a point about midway between the two devices which constitute the can-holder. The curved shape of the band adapts it to fit partly about the cylinder of the can, and its position is such that when the can-carrier arm is at that point (shown in the drawings at the right hand of Fig. 2) where a can is to be placed in position for soldering the can must be entered between the holding devices, one of which bears against either end of the can, by inserting the can from below upward until it comes in contact with the band $f^3$. In the present example a second bearing, $e^2$, projects from the side of the arm immediately opposite the bearing $e'$ and supports the spindle $i$, which carries a can-seat or holding-disk, $f^2$. On the opposite end of the spindle a gear-wheel, $k$, is mounted and meshes with another wheel, $l$, made fast on the shaft F. By this means the rotation of the said shaft causes the can-holding disks $f$ and $f^2$ to rotate at the same speed and in opposite directions.

To permit of the gearing of the two wheels $k$ $l$, which are mounted on opposite sides of the arm, so that their axis of rotation may be in line therewith, the arm is provided with an oblong link-shaped part, $E^3$, and the two wheels mesh with each other through the slot $m$ therein.

If only one can-holding device were to be used on each can-carrier arm, where two are now shown side by side, the following-named parts would be dispensed with, to wit: the bearing $e^2$, disk $f^2$ and its coacting disk, gear-wheels $k$ and $l$, and the link-shaped part $E^3$.

A friction-wheel, F', is attached to the shaft F just above the point where it sets into the step, and is prevented from turning, but is allowed a slight sliding movement endwise on the shaft by means of a feather, $f^5$. (Shown in Fig. 7.) A spring, $f^3$, bears against the wheel and keeps it normally retracted toward the step. It will be seen this wheel is in frictional contact with the driver-wheel $N^2$, and the sliding movement of the wheel F' permits the two to be disengaged.

Figure 1:
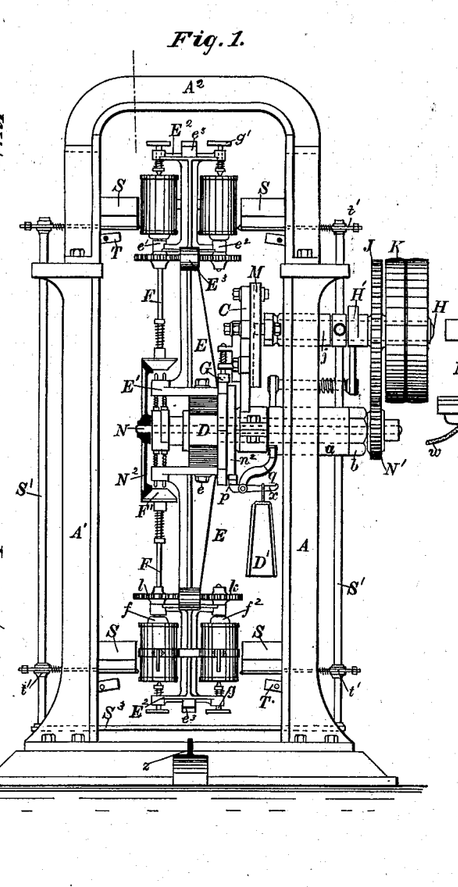
Figure 1 is a front view of the machine.
Figure 2:
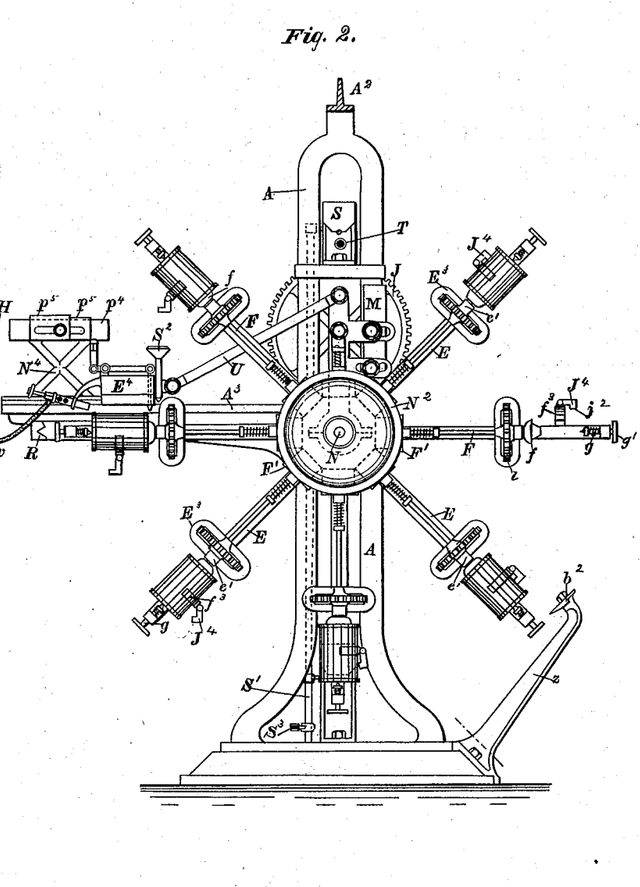
Fig. 2 is a side view of the same, the standard of one side being removed.

The position which the can-holder always occupies with respect to the axis of the vertically-rotating carrier-arm is such that the three seams of the can—to wit, the seam of one end, the side seam of the body, and the seam of the other end—are each presented, one after the other, in a level or horizontal position, as shown in Fig. 2, thereby greatly facilitating the application of solder to the seams. The result just named is, of course, produced without regard to the rotation or non-rotation of the can-holder. Where, as in the present example, it is desired that the can-holder shall be rotated on an axis of its own which shall be radial to the axis of the vertically-rotating carrier, the position of the parts, as described and shown in Figs. 1 and 2, enables very simple mechanism to be employed to effect such rotation of the can-holder.

The foregoing description of one can-carrying arm, with its can-holding device, answers for all the others.

It is to be noted that separate or individual arms are not essential. Instead of one arm or a number of arms, a wheel may be mounted to rotate in a vertical plane. The can-holding devices may be of a construction differing from those shown, as, for instance, spring-jaws which will clamp the can-body may be attached to the carrier in such a manner as to accomplish the same result—viz., to present the can-body upright, so that after the end which is first uppermost has been soldered the other end will be presented uppermost by the half-rotation of the carrier. The hub of the can-carrier may be secured to a shaft so as to turn with it, instead of turning on the trunnion.

The letter $j$ designates a bearing (shown in section in Fig. 3) cast integral with the principal standard A. A shaft, H, is fitted to rotate in this bearing. On the outer end of the shaft and next to the bearing is a collar, I, which will be described hereinafter. Outside of the collar a cam, H', is secured to the shaft which operates the carrier-retaining device, hereinafter described. Outside of the cam a gear-wheel, J, is attached to the shaft, for a purpose hereinafter explained, and outside of said wheel is the drive-pulley K, by which the machine receives its power.

Figures 3, 4, 5:
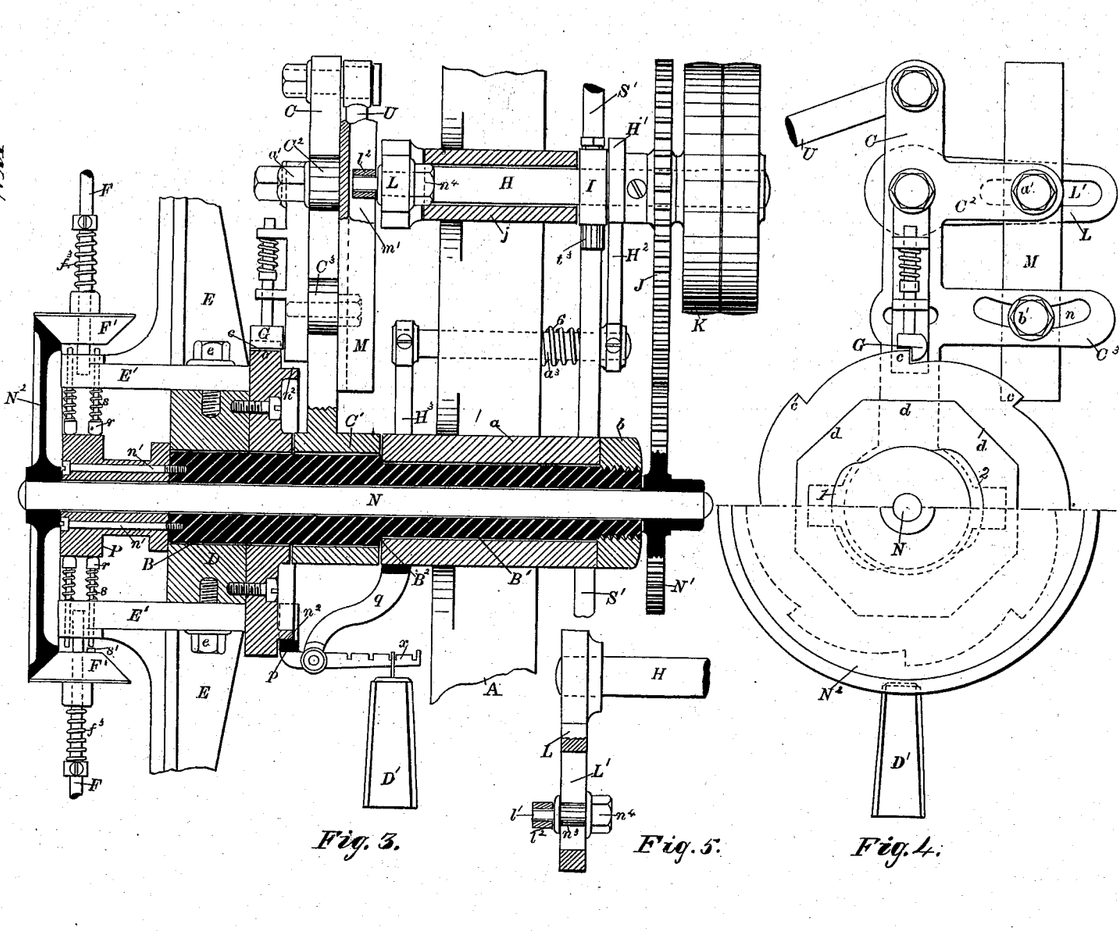
Fig. 3 is a detail view of certain of the parts as seen in Fig. 1. This figure and all that follow are on a larger scale.
Fig. 4 is a view of parts as seen in Fig. 1, and transverse of the view shown in Fig. 3.
Fig. 5 is a view, partly in section, of the crank-arm.

On the inner end of shaft H a crank-arm, L, is attached, (see Figs. 3, 4, and 5,) and serves to rotate the can-carriers. The wrist-pin $l'$ of the crank has a friction-roller, $l^2$, and is adjustable on the arm, toward or from the shaft H, by means of an attached shank, $n^3$, which passes through a slot, L', in the arm. The slot is shown in Fig. 4 and also in Fig. 5, where the arm is partly in section. The shank has a shoulder, which bears on one side, and a nut, $n^4$, on the other side of the crank-arm, by which it is firmly secured in any position.

The upright arm C, which is adapted to rock, carries a spring bolt or pawl, G, which engages with the ratchet-teeth $c$ on the hub, and is also provided on one side with two lateral projections, $C^2$ and $C^3$. The first has a hole for the set-screw $a'$, and the last a segment-shaped slot, $n$, for the set-screw $b'$. A bar, M, having a groove, $m'$, (see Fig. 3,) lengthwise, is secured in a vertical position to the projections $C^2$ and $C^3$ of the rocking arm. The upper end of the grooved bar is fastened by the set-screw $a'$, which also serves as a pivot for the bar, and the lower end by the set-screw $b'$, which permits the said end to be moved laterally to the extent of the length of the slot $n$. The crank-pin and roller $l^2$, in its rotation, traverses the groove $m'$ in the bar, which latter is the medium through which the crank imparts a rocking movement to the upright arm and its pawl, whereby the hub and can-carriers are moved intermittently.

The slot in the crank-arm for the adjustment of the wrist-pin, the grooved bar pivoted at one end, and the segment-slot to permit the lateral adjustment of the other end of said bar, constitute a device for regulating the intermittent movement of the can-carriers, it being important to have control over the said movement, so as to cause the can-carriers to pause with the cans before the solder devices the exact time that may be necessary, for either a longer or a shorter period.

A shaft, N, extends through the hollow trunnion, and has a gear-wheel, N', at its outer end, which gears with the wheel J. A stationary cam, P, is secured to the end of the trunnion by bolts $n'$. The cam is bored through the center to coincide with the bore of the trunnion, and the shaft N extends through it and beyond far enough to receive the friction-wheel $N^2$, which drives the sliding wheel F'. In the present instance the stationary cam has two faces, 1 and 2, forming a double cam. (See Figs. 4, 9, and 10.) On the projecting part E' of each can-carrier arm two movable pins, $r$, are arranged to slide endwise against the sliding pulley F'. A spring, $s$, keeps each pin retracted from the pulley. As the part E' rotates one pin is carried around the cam 1 and the other around the cam 2. A stud, $s'$, is made upon the inner side of sliding pulley F', against which the end of one pin may strike when forced endwise by the cam. The pin serves to press the sliding pulley away from the large pulley $N^2$, disengaging its contact and arresting the rotation of the can-holder. It is necessary that the can-holder should not rotate while the person in attendance is placing an unsoldered can in position in the can-holder, and this is effected by cam 2 pressing on one of the pins $r$. The other cam and second pin $r$ prevent the can-holder from rotating while the heat or solder is being applied to the side seam of the can, as hereinafter explained. If, as is contemplated, the can is placed in the can-holder at one side of the machine with the side seam uppermost, then two pins, $r$, are requisite, in order that the side seam shall be uppermost when the rotation of the can-holder is stopped after the carrier has made a half-revolution to the other side of the machine.

The hub D, on the side adjoining the upright arm, has a cylindrical flange, $n^2$, (see Fig. 3,) the face of which serves for the application of a brake-shoe, $p$, which is suspended by a hanger, $q$. The brake-shoe is balanced on a bar, $x$, to which a weight, D', is hung, and is adjustable to increase or lessen the pressure of the brake-shoe. This brake serves to check the rotation of the can-carriers, by preventing the hub from turning beyond the point to which it is drawn by the spring latch or pawl G.

Figures 11, 12, 13, 14, 15, 16, 17, 18:
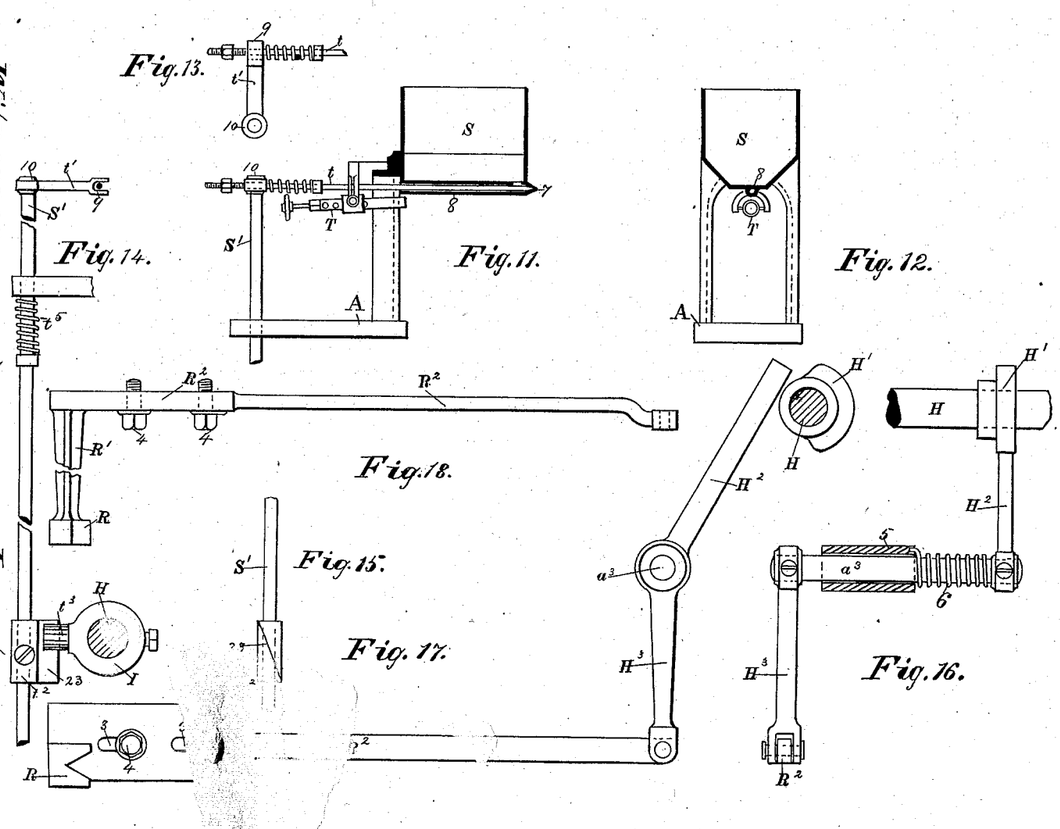

Figs. 16, 17, and 18 illustrate the can-carrier-retaining device, of which the letter R designates a beak or notched block on the arm R', which has a reciprocating movement, adapting the beak to clasp the projecting lug $e^3$ on the end of the carrier-arm E. The arm R' is attached to a bar, $R^2$, which is adapted to have a restricted sliding movement by means of the two slots 3 3, through which are passed the bolts 4 4, which enter the stationary arm $A^3$ of the frame. The end of the bar $R^2$ is joined to the end of an arm $H^3$, which is secured to a rock-shaft, $a^3$, whose bearing 5 is supported on the side standard, A. On the other end of the rock-shaft is secured an upright arm, $H^2$, whose free end is kept pressed against the cam H' by the spring 6, coiled around the rock-shaft, and having one end secured to the shaft and the other to the bearing.

It will be seen the rotation of the cam H' will move the arm $H^2$ away and cause the arm $H^3$ to draw the bar $R^2$, and thus move the beak R against the lug $e^3$ on the can-carrier arm, which is in a horizontal position, as seen in Fig. 2, thereby retaining all the arms from moving while the soldering operation is going on.

With the hereinbefore-described mechanism may be combined solder-applying devices of any suitable kind to use molten solder or wire-solder, and the same may readily be arranged to apply the solder to end seams of a can, where the groove for the reception of the solder is formed by a flange of the head setting over and around the end of the body, or to seams where the groove is on the end of the can formed by the head setting within the end of the can-body.

The letter S designates a stationary molten-solder receptacle mounted on the side standard in proper position to discharge solder from its nozzle 7 on the end seam of a can when the latter is brought into position by the carrier. In the present example four stationary solder-receptacles are shown, (see Fig. 1,) this machine being organized for soldering the ends of four cans simultaneously—that is, while one end of each of two cans is being soldered by the two upper solder-applying devices the opposite end of each of two other cans is being soldered by the two lower solder devices; then, by a half-rotation of the carrier, the cans which had one end soldered by the upper devices are brought into an upright position before the lower solder devices for the application of solder to the opposite end.

A valve is provided in the nozzle of the receptacle by forming a slightly funnel-shaped or tapering seat, which is fitted with a stem, $t$, whose end is slightly conical or pointed to enter the seat. The stem slides endwise through a bearing, 8, and its end is suitably jointed, at 9, to an arm or lever, $t'$. One end of the arm or lever is secured, at 10, to an upright rod, $S'$, by which the lever is moved to open and close the valve. The rod $S'$ has a block, $t^2$, (see Figs. 14 and 15,) which is provided with an inclined face, 23. This block is located at proper position to be acted on by the stud $t^3$, which is attached to the collar I on the rotating shaft H. The rotation of the collar brings the stud at each revolution against the inclined face of the block $t^2$, causing the upright rod $S'$ to be partly rotated, thereby opening the valve to discharge the solder. A spring, $t^5$, keeps the valve-stem normally to its seat.

The mechanism just described for operating the valve in the nozzle of the solder-receptacle may be otherwise constructed. The valve-stem may enter downward through the receptacle, and the rod $S'$ be arranged to draw the valve-stem endwise by giving to the rod $S'$ a slight up-and-down movement instead of a partly rotary one. The two rods $S'$, one of which is on each side of the machine, as seen in Fig. 1, each has a short arm (not shown) projecting at right angles, which are connected together by the rod $S^3$. Thereby the two upright rods are moved in unison.

A burner or blow-pipe, T, of suitable construction for burning either gas or vapor of naphtha, is connected to the side standard or solder-receptacle in such manner as to deliver its flame against the bottom of the receptacle and nozzle and melt the solder and keep it in a molten condition.

A flat knob or circular plate, $g'$, is attached to the end of the spindle $g$ of the can-holder, and serves as a hold for the operator to grasp when he wants to place an unsoldered can in the holder. A trip is provided to release the cans from the holders when the soldering is completed. In the present instance this trip consists of an arm, $z$, secured by its lower end to the base of the machine, and having its upper part curved inward and provided on the end with a cross-bar, $b^2$, the arm and cross-bar forming a T-piece, of which a side view is shown in Fig. 2. The lower side of the cross-bar is beveled or slants, and is in such position, when the carrier rotates and the last seam of the can has been soldered, that the knob $g'$ of the can-holder passes under the beveled side of the T-piece, which serves to draw the center point or disk, $f'$, away from the end of the can, thus releasing the gripe of the can-holder and allowing the can to drop out onto an inclined canvas apron stretched below, but not shown in the drawings.

From the foregoing description it will be seen that in this machine every provision is made for soldering the seams of both the top and bottom heads of a can-body without re-handling the can.

The mechanism for soldering the side or body seam is illustrated in Figs. 2, 19, 20, and 21. On the extremity of the horizontal arm $A^3$ is a slide, $B^4$, on which moves back and forth a plate, $C^4$, to which is fastened the arm $D^4$, which carries the movable molten-solder receptacles $E^4$, each of which is provided in its bottom with a nozzle, $f^4$, and a vertical valve-stem, $g^4$, whose end is pointed to fit a seat in the nozzle. The upper end of the stem is jointed to one end of an arm, $h^4$, the other end of which has an eye, 14, to turn freely on a rock-shaft, $I^4$. A spiral spring, $k^4$, encircles the rock-shaft, to which one end is fast, and the other end of the spring is fast to the eye 14, and by pressing the arm $h^4$ down serves to keep each valve-stem to its seat. A short arm, 15, is rigidly attached to the rock-shaft alongside of each arm $h^4$, and inclines downward over the solder-receptacle, and at its extremity has a lateral projection which extends under the arm. At one end of rock-shaft $I^4$ a short arm, $m^4$, is made fast and extends in a direction opposite that of the valve-stem arms $h^4$. Near the end of arm $m^4$ an upward-extending lever, 16, is attached, by a knuckle-joint or equivalent means, to permit it to turn down toward the solder-receptacle, but to prevent it from turning the other way. A spring, 17, keeps the lever in an upright position. An upright stud or support, $N^4$, is mounted on the arm $A^3$, and has at the upper end a horizontal bar, $p^4$, on which two plates, $p^5$, are adapted to slide, and which may be adjusted on each other to have their combined length correspond to the length of can-body to be soldered. The upright lever 16 is adjustable as to height, and its top passes along the lower edge of the plates $p^5$ when the solder-receptacles move. When moving away from the can the lever 16 strikes against the plates and the joint permits it to turn down, as shown dotted in Fig. 21; but when moving the opposite way the lever is pressed down by the plates, which tilts down the arm $m^4$ and partly turns the rock-shaft, and thereby the arms $h^4$ are raised and the valves opened.

The screws 18, between the two solder-receptacles, pass through slots which permit the receptacles to be adjusted to or from each other, and the screws 19, which pass through slots in the arm $D^4$, permit the receptacles to be adjusted laterally, and by simple mechanism the arm may be adjusted vertically. A coupling-eye, $q^4$, is attached to the sliding plate $C^4$, and a rod, U, connects the same to the upright arm C.

A gage device, $J^4$, (see Figs. 2 and 7,) is provided to regulate the position of the can when the same is placed in the can-holder, to insure that the side seam of the can shall come in a certain relation to the stud on the inner side of sliding pulley F', against which the pin $r$ strikes, in order that when cam 1 presses a pin, $r$, against the pulley F', and stops the rotation of the can-holder, the side seam of the can will be uppermost. The gage consists of a right-angled plate, $J^4$, pivoted to the cross-piece $E^2$ or segment-shaped band $f^3$, and is provided with a knife-edge, $j^2$, which extends lengthwise of the plate. When the can is placed in the can-holder the knife-edge is designed to rest in the crevice which is formed by the side seam of the can.

A heater is arranged to reciprocate with each movable solder-receptacle, in order to keep the heat in constant application therewith. This heater may consist of a lamp or like device to carry its own fuel, and be attached directly to the solder-receptacle, or to a separate arm which will move in unison with the receptacle. In the present instance, however, a burner or blow-pipe, V, is attached to the solder-receptacle, and is so placed that it may be adjusted to direct its flame onto the receptacle at the desired point. The burner is supplied with gas or air and gas by a flexible tube, $w$, connecting with a tank or other source. Instead of a flexible tube, a jointed pipe similar to a gas-bracket may be used.

After the can-holder has passed the trip $z$ the operator places two unsoldered cans in position, and when, on the partial rotation of the carrier, the holders arrive in front of the upper solder-receptacle, S, the seam on one end of each can is soldered, and while this operation is going on the mechanism for soldering the side seams of two other cans is performing its function, and at the same instant the seams on the remaining unsoldered end of each of two other cans are being soldered by the lower solder-receptacles. In this way the cans are soldered—first one end, then the side seam, and finally the other end. This order or sequence for soldering all of the seams of a can is a process differing from all others of which I have any knowledge, and affords, in machine-soldered cans, the advantage of effecting the soldering of all the seams by simply a half-rotation, endwise, of the can, and this will follow whether the construction of the machine be similar to or different from that shown. If this particular order or sequence of soldering is not followed, additional turns of the can would then be necessary, and the operation could not be so speedy.

No claim whatever is herein made to a process for soldering cans consisting of, first, putting together loosely the unsoldered body within the flange of the two heads, and, second, soldering all the seams, as a claim relating in substance thereto is embodied in an application for Letters Patent, to which I am a party.

Figure 19:
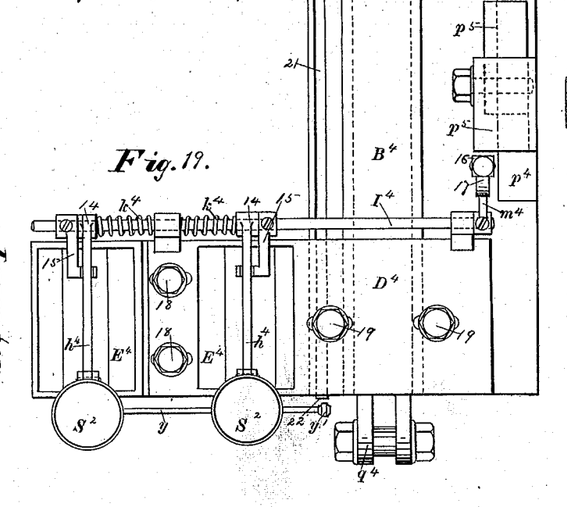
Fig. 19 is a top view of the movable solder-receptacle for soldering the side seam.
Figure 20:
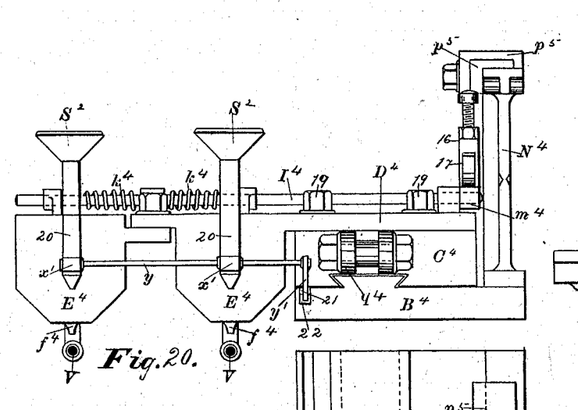
Fig. 20 is a front or end view, and Fig. 21 a side view, of the same.
Figure 21:
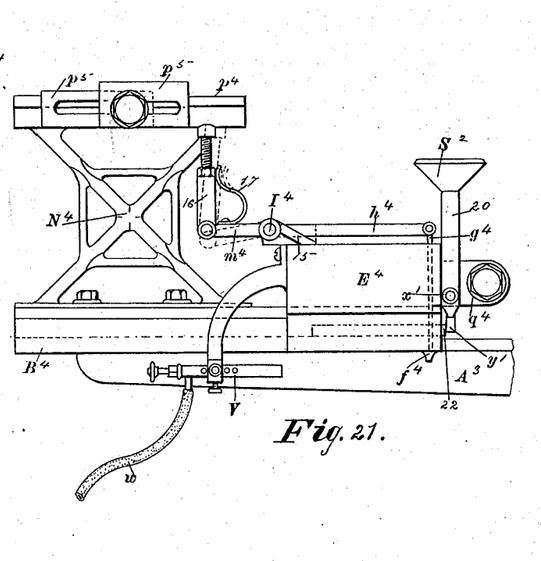

In Figs. 19, 20 and 21 a chilling device is shown for the purpose of speedily chilling the newly-soldered and hot seam of the can, in order that the operation of soldering may progress expeditiously without the delay that would be occasioned by waiting for the molten solder to cool.

The letter $S^2$ designates the receptacle to contain water, and is attached to or in front of the solder-receptacle $E^4$. A tube, 20, connects with the water-receptacle, and has at its lower end an aperture from which the water may issue in a small jet and be delivered onto the side seam of the can. The tube is provided with a valve at $x'$, which is opened and closed by giving the rod $y$ a quarter-turn. At one end of the rod is a downward-projecting lever, $y'$, for moving the valves.

The slide-plate $B^4$ has a groove, 21, extending from one end to the other, and at the end nearest the side standard of the machine a short rod, 22, is placed lengthwise in the groove. This rod may be moved to place it exactly where it is required. The depending lever $y'$ will traverse the groove as the solder and water receptacles reciprocate, and in moving away from the side standard, after the seam has been soldered, the rod 22 causes the lever $y'$ to be raised, as it drags over the rod, high enough to open the valves and discharge water onto the side seam of the can.

I contemplate applying for Letters Patent for an improvement in machines for soldering cans, wherein will be shown a burner so arranged and combined with mechanism as to have a reciprocating movement adapting the burner to apply its heat to the side seam of the can, and I do not herein claim any such combination or arrangement.

The carrier is described as rotating in a vertical plane, but it need not be precisely in a vertical plane. It may incline slightly, if thereby the molten solder in the head seam is not caused to flow to one side.

I do not confine myself to the particular construction shown, as it is evident many of the parts entering into the new combinations which I have invented might be otherwise constructed.

Having described my invention, I claim and desire to secure by Letters Patent of the United States—

1. In a can-soldering machine, the combination, as set forth, of a can-carrier arm having a circular rotary motion in a vertical plane, and a can-holding device attached to the carrier-arm which shall hold a can always in the same position relatively to the horizontal axis of the carrier, whereby access to the seams of the can is afforded when the can is in the various positions required for soldering.

2. In a can-soldering machine, the combination, substantially as set forth, of a horizontal trunnion or shaft, one or more arms mounted on the trunnion or shaft, to rotate with a circular motion in a vertical plane, and a can-holding device attached to each arm which shall hold a can to expose the seam of each end, while the arm makes its revolution, whereby the can-body is presented in an upright position for applying solder to one end, and upon the arm making a half-revolution is again presented in an upright position, but with the ends reversed, for applying solder to the opposite end.

3. In a can-soldering machine, the combination, substantially as set forth, of a trunnion or shaft, a can-carrier arm mounted on the trunnion or shaft, to rotate thereon with a circular motion in a vertical plane, and one or more rotary can-holding devices, attached to the carrier in such position that the axis of rotation of the holder shall always be radial to the trunnion or shaft.

4. In a can-soldering machine, the combination of a rotary can-carrier, two or more independent rotary can-holding devices mounted on the carrier, and each having attached a separate wheel, F', by which it is operated, and a single drive-wheel, N², to gear with and operate simultaneously each of the wheels first named, as set forth.

5. The combination, substantially as set forth, of a rotary can-carrier, a can-holding device mounted on the carrier, a stationary solder-applying device for soldering the seam of one end of a can, and a second stationary solder-applying device for soldering the seam of the other end of a can.

6. The combination, substantially as set forth, of one or more solder-applying devices for soldering the end seams of a can, a solder-applying device to solder the side seam of a can, a can-holding device, and a rotary carrier on which the can-holding device is mounted, whereby the several operations of soldering the ends and side seams are effected in succession.

7. The combination, substantially as set forth, of a can-holding device, one or more solder-applying devices for soldering the end seams of a can, a device to solder the side seam, and mechanism, substantially as described, to effect a unity of action between the said parts, whereby all the seams of a can may be soldered in one operation without rehandling or removing the can.

8. In a can-soldering machine, the combination, substantially as set forth, of a rotary can-holding device, a solder-applying device to solder the side seam, and a gage device, J⁴, substantially as described, to regulate the position of the side seam of the can in the rotary holding device.

In testimony whereof I affix my signature in presence of two witnesses.

GEO. A. BOYDEN.

Witnesses:
CHAS. B. MANN,
JNO. T. MADDOX.